United States Patent [19]

Kitchen

[11] Patent Number: 5,648,834
[45] Date of Patent: Jul. 15, 1997

[54] FILM TENSION SENSING DEVICE

[76] Inventor: Dean J. Kitchen, 6606 Deer Ridge Dr., Clarkston, Mich. 48348

[21] Appl. No.: 598,813

[22] Filed: Feb. 9, 1996

[51] Int. Cl.$^6$ .............................. G03B 1/54; G03B 21/00
[52] U.S. Cl. .................... 396/128; 396/176; 226/44; 242/334.6
[58] Field of Search ........................ 352/176, 175, 352/14, 126, 128, 174; 242/413.6, 420.6, 328, 334.6; 226/42, 43, 44

[56] References Cited

U.S. PATENT DOCUMENTS

| | | | |
|---|---|---|---|
| 3,583,799 | 6/1971 | Walter | 352/166 |
| 3,823,890 | 7/1974 | Potts | 242/328.2 |
| 4,012,003 | 3/1977 | Cochran et al. | 242/420.1 |
| 4,283,766 | 8/1981 | Snyder et al. | 364/525 |
| 5,189,451 | 2/1993 | Bredin | 352/128 |

*Primary Examiner*—A. A. Mathews
*Attorney, Agent, or Firm*—Paul S. Czarnota

[57] ABSTRACT

A tension sensing device for motion picture projection equipment is intended for use in a platter feed system. The device is mounted upon a column of a platter system, having a pivoting arm and a stationary or limiting arm. The film is fed over a roller on the pivoting arm, which rests on a micro-switch. The presence of tension in the film feed will cause elevation of the pivot arm, triggering a signal from the micro-switch to a control box. A timing sequence is initiated; if a pre-determined time interval is reached, the power to the projector equipment is interrupted. This device allows for more precise determination of true headwrap condition, avoiding false conditions, and offers a more durable and reliable sensing device.

17 Claims, 2 Drawing Sheets

FILM TENSION SENSING DEVICE

BACKGROUND OF THE INVENTION

1. Field of the Invention

The present invention concerns motion picture film projection. More particularly, the present invention concerns a film tension sensing device for a motion picture film projector. Even more particularly, the present invention concerns a film tension sensing device that is deployed with a platter feed system operating in conjunction with a motion picture film projector.

2. Description of the Prior Art

The motion picture industry began showing motion picture films to the public initially by use of the carbon arc projector. This machine operated by supplying an electrical current through two carbon rods. Ignition between the carbon rods occurs, supplying a bright light, which can be focused to facilitate the projection of film images.

One of the drawbacks of the carbon arc projector is the mess associated with the burning of the carbon rods. The next advance was the development of the xenon bulb. The bulb facilitated the cleaner operation of cleaner projector equipment. It also lessened the demands placed upon a projector technician during operation.

To this point, the motion picture was displayed by a pair of projectors. While the first projector displays one reel, a second projector is prepared with the next reel to be shown. When the operator sees a cue in the upper right corner of the screen, he starts the second projector and halts the first projector. Thus, a smooth change between machines is effected.

Market demands to improve the product offered to the viewing public and the need to reduce costs prompted the elimination of the dual projector format. This was accomplished by the development of the platter system. The platter system comprises at least two, and commonly three, large rotatable platters. The feature film to be shown, which is contained on several separate reels, is spliced together to form one continuous piece of film. This film is laid on one of the platters, from which it is drawn over pulleys and rollers to the projector. The film is then collected on a second platter, where it is then ready for the next showing, only needing to be re-threaded to the projector. The manifest benefits of the platter system has led to its market dominance in the domestic theaters.

As platter systems gained acceptance, it became known that such systems were prone to a problem called headwrap. This problem occurs by the film becoming tangled around the feed-out rollers on the platter. This would result previously in the breakage of the film, requiring a hasty repair by the technician while patrons waited.

More recently, the film industry has moved to making film from polyester. Such films are much less prone to breakage, as opposed to previous films. Thus, instead of the film receiving the damage in a headwrap situation, the equipment suffers damage. In extreme cases, the damage can render the equipment inoperable and present a premature ending to a film presentation, necessitating refunds and incurring public complaint.

One solution to this problem was to have a device cut the film if a headwrap situation was detected. This is obviously an unworkable situation, which seeks only to lessen the damage to be encountered in a headwrap.

A more reasonable attempt to address this problem of headwrap in a platter feed system is found in U.S. Pat. No. 5,189,451 issued to Bredin. Bredin teaches a tension sensing device in communication with an electrical interrupt circuit. A spring holds a micro-switch in tension. A roller of the device has the film wound there around. If the tension increases, the roller lifts against the spring, activating the micro-switch. The micro-switch, connected by relay to the projector's power supply, interrupts the projector operation.

The Bredin device, however, has several shortcomings. The interruption of power, due to weather conditions, or irregularities in supply from the utility, can cause surges. Since the Bredin device automatically resets itself after power outages, intermittent power interruptions can result in the headwrap and associated damage to the machine. Also, when film tension is removed, the Bredin device resets itself. Thus, safety is sacrificed in such circumstances.

Additionally, the new polyester films often stick together. This may be due to the sticky residues associated with splicing, or to static electricity. Films may also not be dry when first produced, which is called green or wet film. Any of these situations can cause a momentary increase in film tension, which poses no threat to the equipment. Yet the Bredin device will interrupt operation of the projector.

Additionally, the Bredin device itself can be damaged in a headwrap condition. The Bredin device utilizes a spring. This member will fatigue and fail over time. An extreme headwrap can hasten this process. The device is formed of a thin gauge of aluminum, which could be deformed by the tension of a headwrap. Thus, the Bredin device could itself conceivably interrupt a motion picture presentation.

Thus, there is a need in the art for a device to detect excess tension in the film feed of a motion picture projector. Further, this device must be capable of detecting true headwrap conditions from momentary tension increases due to other circumstances. Additionally, a tension detection device is desired that is durable and resistant to damage.

It is to these needs that the present invention is directed.

SUMMARY OF THE INVENTION

The present invention is a film tension sensing device for use with a platter feed film projector system, comprising:

(a) means for mounting the device to the platter feed film projector system;

(b) means for sensing excessive film tension;

(c) means for measuring the period of excessive film tension and comparing the period with a predetermined period; and (d) means for permanently interrupting projection of the film until an operator manually resets the equipment when the period of excessive film tension equals the predetermined period or when a power outage occurs.

Additonally, the device of the present invention may further comprise means for manually resetting the film tension sensing device. Preferredly, this would comprise a reset button, requiring an operater to attend to the equipment before resetting by depressing the button.

In the preferred embodiment, the means for mounting the device comprises a mounting plate, which is attached to the column of a platter feed system. Alternately, a stationary arm is attached to the mounting plate, and the stationary arm is attached to the column.

The device may further comprise means for alerting an operator to the interruption of film projection. The device may also further comprise means for alerting personnel remote from the projection area to the stoppage of film projection.

In the preferred embodiment, the means for sensing excessive film tension comprises a pivoting arm mounted upon the mounting plate. Further, the means for sensing comprises a micro-switch, which the pivoting arm rests upon unless excessive tension exists in the film. In this case, the arm will rise off the switch, initiating a timing sequence.

The device may also comprise a means for limiting the pivoting of the pivoting arm.

The present invention will be more clearly understood by the following detailed description, with reference being made to the accompanying drawings, in which like reference numerals refer to like parts, in which:

DETAILED DESCRIPTION OF THE PREFERRED EMBODIMENTS

Figure 1:
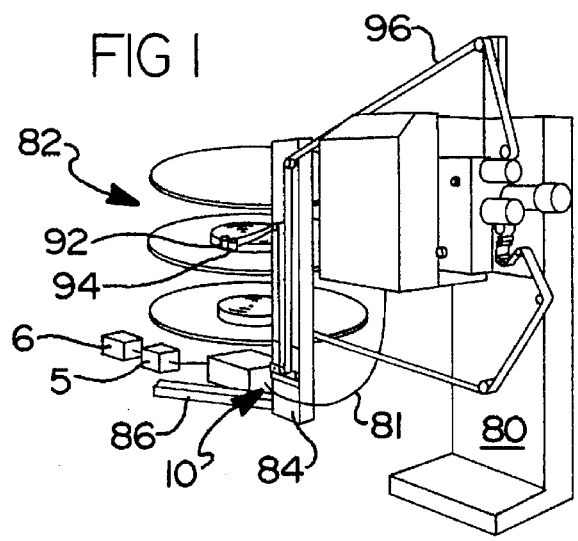
FIG. 1 is a perspective view of the film tension sensing device of the present invention.

Referring now to FIGS. 1–4, there is shown therein the present invention, to wit, a film tension sensing device 10. The device 10 comprises a mounting plate 12, a stationary arm 14, a pivoting arm 16 with roller 18, a micro-switch 20 and a control box 22.

Figure 2:
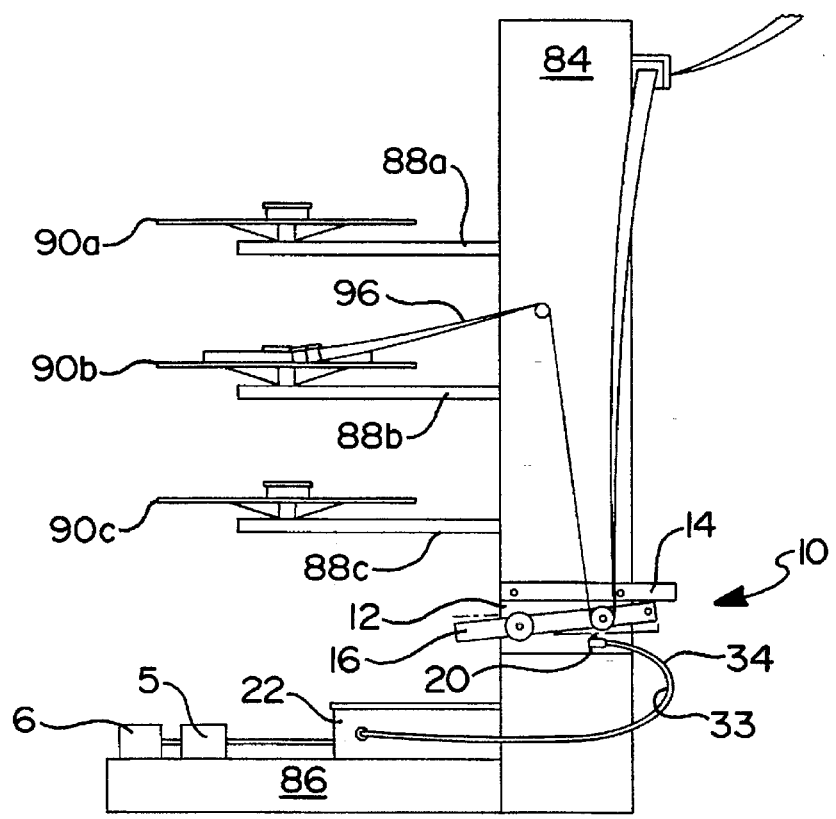
FIG. 2 is an environmental view of the film tension sensing device of the present invention, the device mounted on a film platter.

As shown in FIG. 1, a projector 80 is deployed in conjunction with a platter feed system 82. As seen in FIGS. 1 and 2, the platter feed system 82 comprises a column 84 and a base 86. The base 86 rests upon the floor of the area in which the projector 80 and the platter feed system 82 are deployed. The column 84 is attached by welding or similar permanent securement, substantially perpendicular to the base 86. A plurality of arms 88a, 88b, 88c are deployed substantially perpendicular from the column 84 and parallel to the base 86. A plurality of platters 90a, 90b, 90c are rotatably mounted upon the arms 88a, 88b, 88c. Each platter 90a, 90b, 90c has a pair of swiveling rollers, such as the rollers 92, 94 on platter 88b. The film 96 deployed on the platter 88b is fed through the rollers 92, 94 and onto the roller 18 of the tension sensing device 10 of the present invention. From here, the film 96 is fed through the projector 80 and is finally collected on a separate platter 90c.

Figure 3:
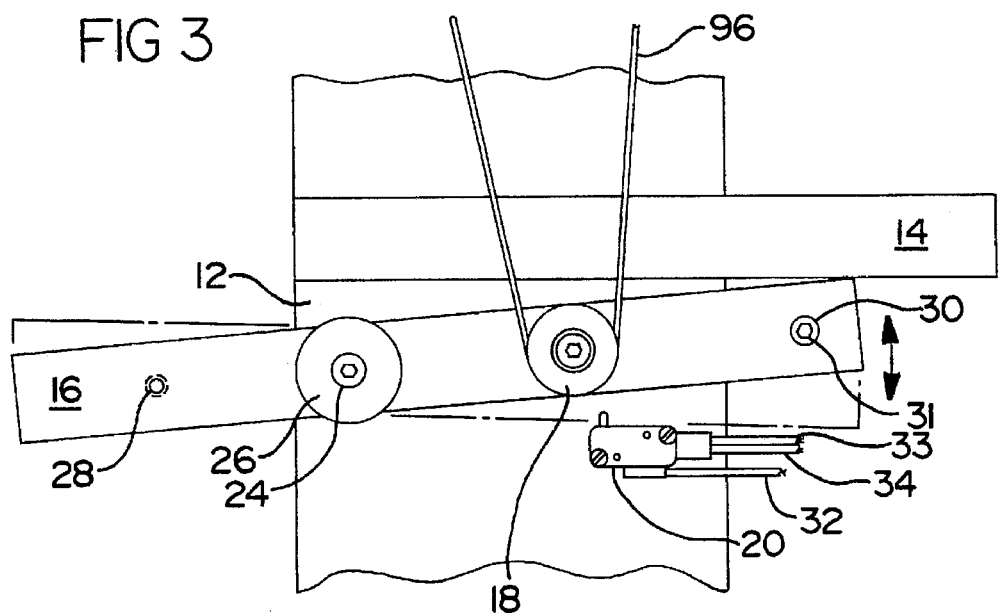
FIG. 3 is a front view of the film tension sensing device of the present invention.
Figure 4:
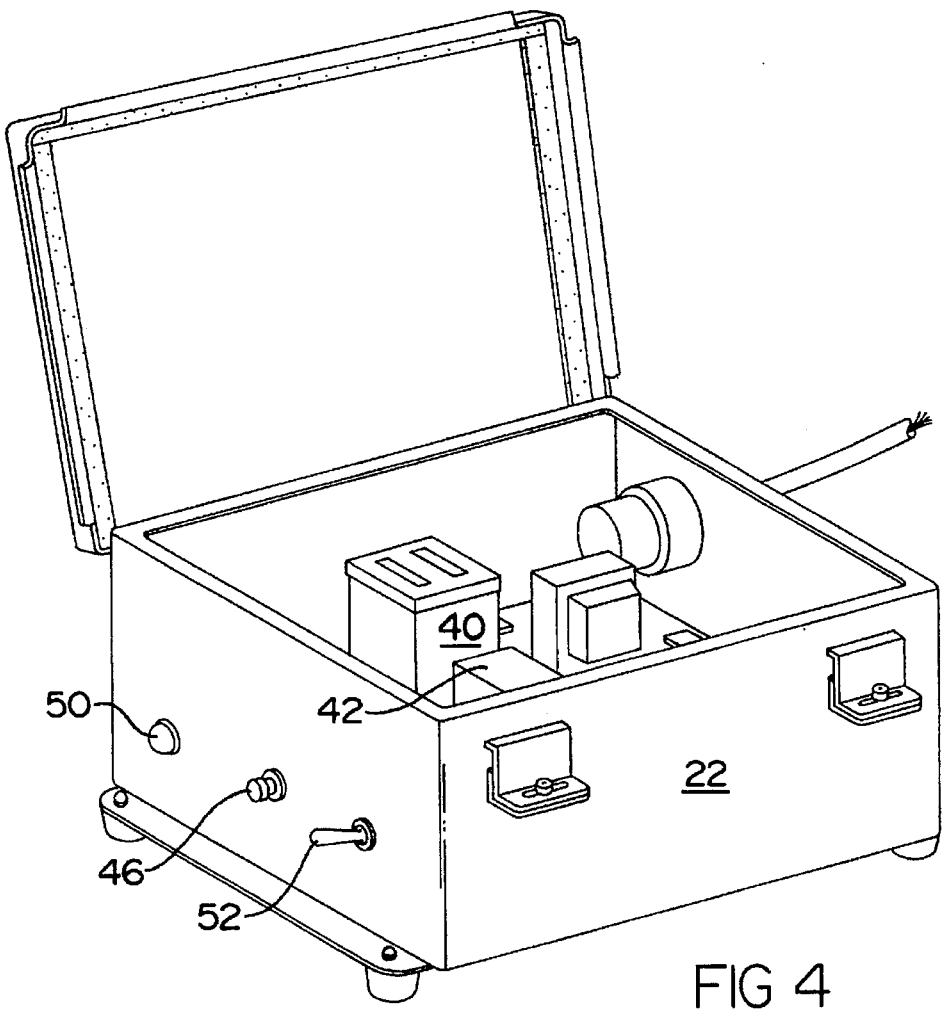
FIG. 4 is a perspective view of the control box of the film tension sensing device of the present invention.

As best seen in FIGS. 2 and 3, the tension sensing device 10 has a mounting plate 12, which is attached to the column 84 and serves as a means for mounting. The stationary arm 14 and the pivoting arm 16 are mounted upon the mounting plate 12. The stationary arm 14 serves as a physical block to the pivoting arm 16, such that when tension from the film 96 pulls the pivoting arm 16 upward, the progress of the pivoting arm 16 is limited. Thus, the stationary arm 14 is a means for limiting the pivoting arm 16. The stationary arm 14 may alternately serve as a means for mounting the device 10 to the column 84. In this alternative, the platter feed system 82 may need, for proper film alignment and feeding, for the device 10 to be offset in its mounting. In this case, the stationary arm 14 serves as the means for mounting the device 10 to the column 84.

The pivoting arm 16 is rotatably secured to the mounting plate 12 by a combination of washers 24 and a bolt 26. A film roller 18 is mounted upon the pivoting arm 16. The film 96 is fed around this film roller 18 such that excessive tension on the film 96 acts to pull the film roller 18 and pivoting arm 16 upward. The roller 18 has an extra-long shaft and it mounted with nylon spacer bearings, so that the lateral alignment of the film be easily adjusted on whatever equipment it is deployed on. The pivoting arm 16 has a threaded hole 28 found therein to facilitate the mounting of a counterweight thereon (not shown). An additional threaded hole 30 is provided to facilitate the mounting of extra weight, shown as 31. This allows a precise adjustment of the sensitivity of the pivoting arm 16 to accommodate the peculiarities of different projection equipment. The threaded holes 28, 30 and the weights 31 attached thereto serve as means for weight-balancing the pivoting arm 16. Thus, the pivoting arm 16 serves as a means for detecting excessive film tension in the present invention.

A micro-switch 20 is deployed on the mounting plate 12 below the pivoting arm 16. The pivoting arm 16 rests upon the micro-switch 20. Communication lines 32, 33, 34 connect the micro-switch 20 with the control box 22. The micro-switch 20 sends a signal to the control box 22 via the lines 32, 33, 34 when the pivot arm 16 is raised off the switch 20. A reset signal is sent via lines 32, 33, 34 to the control box 22 when the arm 16 rests or is repositioned upon the switch 20. The micro switch 20 and the pivoting arm 16 cooperate with timing relay 40 to initiate the determination of whether this is a headwrap situation, or a momentary increase in film tension. Thus, the pivoting arm 16 and switch 20, along with the communication lines 32, 33, 34 serve as a means for initiating a timing sequence and means for resetting the timing sequence.

It is noted that equivalent members for the micro-switch 20 are envisioned. Specifically, the switch 20 could be replaced with sensors, particularly optical, which can determine the location of the pivotal arm 16. Such sensors are then connected to the control box 22, in a manner similar with the micro-switch 20.

The control box 22 begins the timing sequence when the pivot arm 16 is raised by the excessive film tension off the micro-switch 20, and a signal is received via the communication lines 32, 33, 34 from the switch 20. Once a predetermined period of time has passed with the pivoting arm 16 being off the micro-switch 20 without interruption, the timing relay 40 deenergizes a coil in a 3-pole double relay 42. This deenergizing results in the opening of the contacts of the relay 42, which in turn result in power interruption to the platter system 82 and the projector 80. A signal is sent to the projector 80 by line 81, which triggers the fail-safe on the projector. A reset button 46 may be pushed to energize the relay 42 and allow resumption of the movie projection. This presumes the condition causing the elevation of the pivot arm 16 has been rectified and the pivot arm 16 again rests on the micro-switch 20. This effects a resetting of the timing cycle of relay 40. Thus, the control box 22 and its elements cooperate with the pivoting arm 16 and the switch 20 to serve as a means for measuring the period of excessive film tension. The relays in the control box 22 and the communication lines 81 associated therewith serve as means for interrupting projection, including stopping power to both the projector 80 and the platter feed system 82. In the preferred embodiment, the power to run the platter 82 is drawn through the control box 22. Thus, no signal lines are needed, as the control box 22 cuts the power automatically to the platter 82.

The advantages of the present invention over the prior can be seen firstly in the use of the timing sequence in the control box 22. As stated, film tension can be momentarily increased during projection by situations other than a headwrap condition. Some such conditions are static electricity present on the film, or sticky residues from spicing tape. When this occurs, the film tension would be strong enough to trigger a device such as Bredin. The present invention eliminates the possibility of stopping projection in a non-headwrap situation, and avoids unnecessary interruption of the film being presented and alleviating patron frustration.

Another situation where the present invention is clearly superior over the art of record is in a power outage, particularly in an electrical storm. If power is interrupted, the Bredin device resets itself. When power is restored, the platter will return to action. This can cause a surge, resulting in damage to the film or the equipment. In the present invention, interruption of power will require a resetting of the equipment. This will facilitate a smooth starting of the equipment, avoiding headwrap situations and surges in film feeding and operation.

A light 50 is provided to indicate power being applied to the box 22, which is the standard alternating current from a wall outlet, the box 22 having an appropriate power transformer therein to supply the direct current needed, as is well known. All components in the control box 22 are well known and available commercially to the artisan in the market. A by-pass switch 52 is provided to allow the projector 80 to operate without the timing circuit of the control box 22 functioning.

In use, the operator has loaded a feature film 96 on one of the platters 90b. The film 96 is then threaded through the platter rollers 92, 94 and around the roller 18 of the device 10. The film 96 is then fed through the projector 80 and collected on a second platter 90c.

During operation, if excessive tension such as that associated with headwrap occurs, the tension causes the pivot arm 16 to be raised off the micro-switch 20, possibly contacting the stationary arm 14. This lifting of the pivot arm 16 sends a signal from the micro-switch 20 to the control box 22, starting a timing sequence in the timing relay 40. If the tension is only momentary, due to static electricity for example, the pivot arm 16 will lower back onto the micro-switch 20, resetting the timing relay 40. If the tension is sustained for a pre-determined period, which period can be adjusted via relay 40 to the unique features of an individual projection system, the relay 40 acts to deenergize a coil in the relay 42, which sets in motion the interruption of the projector and/or other associated equipment, having detected a headwrap condition. Thus, the equipment is spared severe damage, and the malfunction can be corrected with minor inconvenience to the viewing patron. To reset the equipment, the reset button must be depressed, as the equipment will not restart without this being done. This is an added safety measure for both operator and equipment.

It is to be noted that, in an alternate embodiment of the present invention, the device 10 may additionally comprise means 5 for alerting the operator to the presence of a headwrap condition. Such means for alerting would comprise either an audible alarm, a visual indicator, such as a light, or a combination of these means. Additionally, the device 10 may comprise means 6 for alerting personnel remote from the projection booth. This may be accomplished by signal wires being run from a projection area to an area remote therefrom, such as the snack counter, ticket booth or manager's office. Alternately, the means 6 for alerting remote personnel may be a transmitter, which triggers suitable signals, such as audible signals or visible signals, at a receiving station (not shown).

Having, thus, described the invention, what is claimed is:

1. A film tension sensing device for use with a platter feed film projector system, comprising:
    (a) means for mounting the device to the platter feed film projector system;
    (b) means for sensing the beginning of a period of excessive film tension; and
    (c) means for measuring the period of excessive film tension and comparing the period with a pre-determined period.

2. The film tension sensing device of claim 1, further comprising:
    means for alerting an operator to the period of the excessive film tension being greater than the pre-determined period.

3. The film tension sensing device of claim 1, further comprising:
    means for alerting personnel at a remote location to the period of the excessive film tension being greater than the pre-determined period.

4. The film tension sensing device of claim 1, further comprising:
    means for manually resetting the film tension sensing device.

5. A film tension sensing device for use with a platter feed film projector system, comprising:
    (a) a mounting plate;
    (b) a pivoting arm mounted upon the mounting plate;
    (c) a micro-switch mounting upon the mounting plate, the switch being deployed below the pivoting arm such that the arm may rest upon the switch the arm being raised off the switch when a period of excessive film tension begins; and
    (d) means for measuring the period of excessive film tension and comparing the period with a pre-determined period.

6. The film tension sensing device of claim 5, further comprising:
    means for alerting an operator to the period of the excessive film tension being greater than the pre-determined period.

7. The film tension sensing device of claim 5, further comprising:
    means for alerting personnel at a remote location to the period of the excessive film tension being greater than the pre-determined period.

8. The film tension sensing device of claim 5, further comprising:
    means for stopping the pivoting of the pivoting arm.

9. The film tension sensing device of claim 8, wherein the means for stopping comprises a stationary arm mounted on the mounting plate such that the pivoting arm is between the switch and the stationary arm.

10. The film tension sensing device of claim 5, wherein the means for measuring the period of excessive film tension comprises a timing relay, the timing relay being in communication with the micro-switch, such that lifting of the pivot arm off the switch sends a signal to the timing relay, initiating measurement of the period of excessive film tension.

11. The film tension sensing device of claim 5, further comprising:
    means for weight-balancing the pivoting arm.

12. The film tension sensing device of claim 5, further comprising:

means for manually resetting the film tension sensing device.

13. A film tension sensing device for use with a platter feed film projector system comprising a platter film feed system and a film projector, the device comprising:

(a) a mounting plate;

(b) a stationary arm mounted upon the mounting plate;

(c) a micro-switch mounted upon the mounting plate such that the switch is mounted below the stationary arm;

(d) a pivoting arm mounted upon the mounting plate between the stationary arm and the switch;

(e) a film roller mounted upon the pivoting arm, a film passing around the roller;

(f) means for weight-balancing the pivoting arm;

(g) a control box being in electrical communication with the micro-switch and the platter feed film projector system, the control box having a timing relay, the timing relay measuring any period of excessive film tension, the timing relay being in communication with means for interrupting power to the platter feed film projector system.

14. The film tension sensing device of claim 13, further comprising:

means for alerting an operator to the interruption of the film projection.

15. The film tension sensing device of claim 13, further comprising:

means for alerting personnel at a remote location of the interruption of the film.

16. The film tension sensing device of claim 13, further comprising:

means for alerting an operator to the interruption of the film projection; and means for alerting personnel at a remote location of the interruption of the film.

17. The film tension sensing device of claim 13, further comprising:

means for manually resetting the film tension sensing device.

* * * * *